United States Patent
Day et al.

(10) Patent No.: US 7,166,649 B2
(45) Date of Patent: Jan. 23, 2007

(54) POLYESTER-POLYETHER HYBRID URETHANE ACRYLATE OLIGOMER FOR UV CURING PRESSURE SENSITIVE ADHESIVES

(75) Inventors: David E. Day, Columbus, OH (US); Thomas M. Moy, Hilliard, OH (US); Vincent J. Pascarella, Perrysville, OH (US)

(73) Assignee: Ashland Chemical, Inc., Columbus, OH (US)

( * ) Notice: Subject to any disclaimer, the term of this patent is extended or adjusted under 35 U.S.C. 154(b) by 14 days.

(21) Appl. No.: 10/832,871

(22) Filed: Apr. 27, 2004

(65) Prior Publication Data

US 2005/0239916 A1 Oct. 27, 2005

(51) Int. Cl.
*C08F 2/46* (2006.01)
*B32B 7/10* (2006.01)
*B32B 7/12* (2006.01)
*B05D 5/10* (2006.01)

(52) U.S. Cl. ............... 522/96; 522/90; 522/97; 522/150; 522/152; 522/173; 522/174; 522/182; 428/355 N; 428/355 R; 427/208.4; 427/207.1

(58) Field of Classification Search ........... 522/90, 522/96, 97, 150, 152, 173, 174, 182; 428/355 N, 428/355 R; 427/208.4, 207.1
See application file for complete search history.

(56) References Cited

U.S. PATENT DOCUMENTS

2004/0084138 A1* 5/2004 Henke et al. ............ 156/272.2

FOREIGN PATENT DOCUMENTS

WO  WO 0234858 A1 * 5/2002

* cited by examiner

*Primary Examiner*—Sanza L. McClendon
(74) *Attorney, Agent, or Firm*—Mueller Smith & Matto

(57) ABSTRACT

The invention is a pressure sensitive adhesive (PSA) composition, which is the ultraviolet radiation (UV) cured reaction product of a polyester-polyether-based urethane acrylate, one or more acrylate monomers, and a UV photosensitizer. The polyester-polyether-based urethane acrylate is the reaction product of between about 50 and 90 wt-% of a polyester diol having a molecular weight ranging from about 500 to 3200; between about 10 and 50 wt-% of a polyether polyol having a molecular weight ranging from about 1000 to 6000; between about 1 and 5 wt-% of a hydroxy-functional acrylate; and a polyisocyanate.

28 Claims, No Drawings

POLYESTER-POLYETHER HYBRID URETHANE ACRYLATE OLIGOMER FOR UV CURING PRESSURE SENSITIVE ADHESIVES

CROSS-REFERENCE TO RELATED APPLICATIONS

None

STATEMENT REGARDING FEDERALLY SPONSORED RESEARCH

Not applicable.

BACKGROUND OF THE INVENTION

The present invention generally relates to pressure sensitive adhesives (PSA's) and more particularly to PSA's that are ultraviolet radiation (UV) curable for use as, inter alia, screen-printable or flexo-printable labeling, tape, nameplate, or membrane switch adhesives.

UV-curing pressure-sensitive adhesives potentially offer a cost-effective, high productivity alternative to conventional solvent or waterborne adhesive technologies. The UV-curing PSA's commonly are comprised of an acrylate-functionalized (aromatic or aliphatic) urethane or other oligomer, blended with acrylic monomers, photoinitiators, and various additives to aid processing. Rapid, complete conversion from unreacted liquid to crosslinked, solid adhesive is essential.

The basic construction of the urethane portion of the urethane acrylate oligomer is formed from the catalytic reaction of a difunctional or trifunctioinal polyol and a difunctional isocyanate. This reaction yields a molecular framework that gives a uniform soft, flexible constituent within the macromolecule from the polyol, which facilitates the UV PSA's ability to "wet-out" and adhere to bonding surfaces. The isocyanate groups create a harder linkage segment, which joins the polyol to a capping acrylate, which reacts under UV light to incorporate the urethane acrylate oligomer into the acrylic network structure via free radical chain polymerization.

The convention of the current technology has been to use either a difunctional polyester or polyether polyol within the urethane acrylate oligomer framework. The use of a polyester polyol based urethane acrylate typically yields a UV curing PSA which possesses physical properties of higher peel and tack to high energy substrates, such as, for example, stainless steel, and at low energy surfaces, such as, for example, high density polyethylene, and of sufficient cross-link density to suspend 1 square inch 2-Kg shears at ambient temperature and 1 square inch 1-Kg shear at elevated temperatures (200° F.) for $\geq 2$ weeks. A deficiency of the polyester based system comes from the internal hydrogen bonding of the polyester-based urethane's molecular backbone whereby the blending of this oligomer with acrylate monomers at 40 to 60 weight percent creates a UV curing PSA formulation with relatively high viscosity. This may hinder some application processes, such as screen-printing. Another potential deficiency of the polyester-based system is in the area of thumb appeal, i.e., how "sticky" the adhesive feels to the touch.

The use of a polyester based urethane acrylate typically yields a UV curing PSA which possesses better UV environmental stability and resistance to yellowing as a result of weathering or oxidation, relative to polyether based oligomers. Polyether polyols characteristically afford softer urethane oligomers with superior hydrolytic stability relative to the polyester-based materials. The polyether based oligomer also typically possess physical properties of moderate peel and tack to high energy surfaces, such as, for example, stainless steel, and much lower peel and tack strengths to low energy surfaces. They also have sufficiently high crosslink density to suspend 1 square inch 2-Kg shears at ambient and marginally suspends 1-Kg shears at elevated temperatures (200° F.) for $\geq 2$ weeks and intrinsically have much better thumb appeal and much lower viscosities as compared to the polyester based oligomer UV curing PSA of comparable molecular weights.

BRIEF SUMMARY OF THE INVENTION

The invention, then, in one aspect is a pressure sensitive adhesive (PSA) composition, which is the ultraviolet radiation (UV) cured reaction product of a polyester-polyether-based urethane acrylate, one or more acrylate monomers, and a UV photosensitizer. The polyester-polyether-based urethane acrylate is the reaction product of between about 50 and 90 wt-% of a polyester diol having a molecular weight ranging from about 500 to 3200; between about 10 and 50 wt-% of a polyether polyol having a molecular weight ranging from about 1000 to 6000; between about 1 and 5 wt-% of a hydroxy-functional acrylate; and a polyisocyanate.

The invention in another aspect relates to urethane acrylate oligomers derived from a blend of a difunctional polyester polyol of great than about 85 parts per hundred and less than about 20 parts per hundred of a difunctional polyether polyol of the total polyol mixture dispersed in 10–20 weight percent ("wt-%") acrylic monomer reactive diluent. In combination, the polyol mixture is co-reacted catalytically with a difunctional isocyanate in sufficient quantity so that, statistically, the diisocyanate is reacted with the polyol and a low molecular weight hydroxy functional acrylate to obtain a urethane oligomer "end capped" with acrylate groups available for further reaction. Liquid compositions including between 20 to 70 wt-% of the urethane acrylate oligomers with one or more monofunctional acrylates, as reactive diluents, and one or more photoinitiators, exposed to an appropriate radiation source, e.g., ultraviolet light, will react to form solid, crosslinked thermoset materials. The disclosed formulations have applicability in pressure sensitive adhesive applications.

In another aspect the invention is a method for formulating an ultraviolet radiation (UV) curable pressure sensitive adhesive (PSA), which includes the steps of forming the novel polyester-polyether-based urethane acrylate and subjecting said reaction mixture to the influence of ultraviolet radiation to form a PSA.

DETAILED DESCRIPTION OF THE INVENTION

Polyester and polyether polyols, as physical mixtures of equal proportions, are not miscible; however, mixtures of polyester polyols with polyether polyols can be achieved in a common solvent or acrylate monomer at greater than about 15 weight percent. Blending of a difunctional polyether polyol (minor component, say, less than about 50 weight percent) with a difunctional polyester polyol (major component) and carrier acrylate to solvate the mixture, followed by co-reaction of the resulting mixture with an aromatic or aliphatic di-functional isocyanate and hydroxyl-functional acrylate yields a "hybrid" polyester-polyether based urethane acrylate. Formulation with an appropriate combination of acrylate monomers, photoinitator(s), and additives, followed by exposure to an appropriate UV source produces a PSA that exhibits a good balance of the physical properties possessed by an adhesive based solely on either the polyester or polyether based oligomer and is distinct from the physical blend of the urethane acrylate systems containing either polyester and polyether polyols in terms of compatibility and to some degree physical properties. Urethane theoretical <$M_n$>'s were in the range of ≧8000 Daltons, however, considerably higher molecular weight urethanes could conceivably be used.

The basic construction of the urethane portion of a urethane acrylate oligomer is formed from the catalyzed reaction (e.g., tin catalyst) of a difunctional polyol and a difunctional isocyanate. This reaction yields a molecular network that gives a uniform soft, flexible constituent within the macromolecule from the polyol segments, which facilitates the UV PSA's ability to "wet-out" and adheres to bonding surfaces. The isocyanate groups create a harder linkage segment, which join the polyol to a capping acrylate, which reacts under UV light to tie the urethane acrylate oligomer into the polymerizing acrylate monomers free radically.

In comparative studies, physical blends of a 100% polyester based acrylate terminated urethane with a 100% polyether based acrylate terminated urethane at a weight ratio of ≧80:20 initially appeared to compatibly blend into formulated UV curing PSA compositions with other mono and difunctional acrylates; however, the physical blends began to evidence incompatibility within less than one day of being formulated into an adhesive blend of acrylic monomers, photoinitiators, and various additives to aid processing. The physical blends became cloudy in less than 24 hours, in contrast to analogues (inventive polyester-polyether-based urethane acrylate) that have been synthesized from a co-reactive route. In addition, the physical blends of polyether based urethane acrylate oligomer with a polyester based urethane acrylate (in a comparable adhesive formulation with monofunctional acrylates as reactive diluents and photoinitiator) showed a slight elevation of ambient temperature viscosity, and significantly reduced ambient 1 square inch 2-Kg shears and 1-Kg elevated temperature (200° F.) shears at 1 square inch. Although peel and loop tack values were elevated, the failure mode appeared to indicate incomplete curing under UV-A (315–400 nm), as evidenced by significant "ghosting" residue on the substrate's adhesion surface following removal of the adhesive. The Examples will report the details of this study.

Polyesters can be synthesized, for example, by reacting $C_1$–$C_{12}$ diacids (or their corresponding anhydrides) or other diacids with a diol or a mixture of diols. The mixture is heated in the presence of a catalyst to temperatures sufficient to remove the water formed in the condensation reaction. These materials have molecular weights of, for example, about 500–3200 (Mn), and are typically room temperature fluids; if solid/semisolid at room temperature (25° C.) it is preferred that they are noncrystalline. Glass transition temperature ($T_g$) should be below room temperature (25° C.) and preferably below 0° C.

Polyethers can be synthesized from ethylene oxide to have a molecular weight of, for example, about 1,000–6000 (Mn) by conventional techniques well known in the art. Polyether polyols (e.g., block polyethylene and polypropylene oxide homo- and co-polymers) optionally alkylated (e.g., polytetramethylene ether glycols) also can be used in formulating the inventive PSA. Additionally, ethylene oxide and propylene oxide can be co-reacted to form the polyether polyol, or the polyether polyol can be built on a di-functional compound that contains groups reactive with ethylene oxide and propylene oxide. Such suitable groups include, for example, hydroxyl groups, thiol groups, acid groups, and amine groups. Accordingly, diols, triols, dithiols, diacids, diamines, and the like, are suitable di-functional compounds which can be reacted with ethylene oxide and/or propylene oxide for synthesizing the polyether of the present invention. Suitable such compounds include, for example, alkylene glycols, typically ranging from about 2 to 8 carbon atoms (including cycloalkylene glycols). Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methyl pentane,1,5-diol, 1,4-cyclohexanedimethanol, and the like, and mixtures thereof. Diethylene glycol, dipropylene glycol, and the like additionally can be used as necessary, desirable, or convenient.

A hydroxy (meth)acrylate monomer is included to functionalize the polyester-polyether urethane for later UV curing. Suitable hydroxy (meth)acrylates include, for example, hydroxyethyl (meth)acrylate, hydroxypropyl (meth)acrylate, hydroxybutyl (meth)acrylate, caprolactone acrylate and the like. Alternatively, other hydroxy functional monomers may be employed, for example, hydroxybutyl vinyl ether or allyl alcohol. In keeping with terminology in this field, the parenthetical group is optional. Thus, "(alkyl)acrylate" means "acrylate and alkylacrylate".

Isocyanate-functional reactants are made from polyisocyanates reacted with a compound containing active hydrogen functionality with hydroxyl groups being typical, although mercaptan groups, amine groups, and carboxyl groups also can be used. Polyisocyanates are conventional in nature and include, for example, hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl) cyclohexane ($H_6$XDI), dicyclohexylmethane diisocyanate ($H_{12}$MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates available commercially as, for example, Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like and mixtures thereof. Triisocyanates and high-functional isocyanates also are well known and can be used to advantage. Aromatic and aliphatic diisocyanates, for example, (including biuret and isocyanurate derivatives) often are available as pre-formed commercial packages and can be used to advantage in the present invention.

Active hydrogen equivalents should predominate over isocyanate equivalents in the polyisocyanate/polyol reaction mixture in order for the resulting prepolymer to not contain residual isocyanate groups. Reaction conditions for this reaction are well known in the art, such as described by Heiss, et al., "Influence of Acids and Bases on Preparation of Urethane Polymers", *Industrial and Engineering Chemistry*, Vol. 51, No. 8, August 1959, pp. 929–934. Depending upon the reaction conditions used (such as, for example, temperature and the presence of strong acids or bases, and catalysts), the reaction may lead to the formation of ureas, allophanates, biurets, or isocyanates.

The difunctional polyester polyol and difunctional or trifunctional polyether polyol, hydroxy-functional acrylate, and isocyanate are reacted under conventional condensation conditions to form a urethane acrylate.

The thus-formed urethane acrylate then is blended with additional acrylate monomers, UV sensitizers, and other optional ingredients to form the inventive PSA. Representative useful additional acrylate monomers include, for example, one or more of acrylic acid, beta-CEA (beta-carboxyethyl acrylate), 2(2-ethoxyethoxy)ethyl acrylate, 2-phenoxyethyl acrylate, 2-phenoxyethyl methacrylate, alkoxylated lauryl acrylate, alkoxylated phenol acrylate, alkoxylated terahydrofurfuryl acrylate, caprolactone acrylate, cyclic trimethylolpropane formal acrylate, ethoxylated (10) hydroxyethyl methacrylate, ethoxylated (2) hydroxyethyl methacrylate, ethoxylated (4) nonyl phenol acrylate, ethoxylated (4) nonyl phenol methacrylate, ethoxylated (5) hydroxyethyl methacrylate, ethoxylate nonyl phenol acrylate, isobornyl acrylate, isobornyl methacrylate, isodecyl acrylate, isodecyl methacrylate, isooctyl acrylate, lauryl acrylate, lauryl methacrylate, methoxy polyethylene glycol (350) monoacrylate, methoxy polyethylene glycol (350) monomethacrylate, methoxy polyethylene glycol (550) monoacrylate, methoxy polyethylene glycol (550) monomethacrylate, octyldecyl acrylate, polypropylene glycol monomethacrylate, propoxylated (2) allyl methacrylate, stearyl acrylate, stearyl methacrylate, tetrahydrofurfuryl acrylate, tetrahydrofurfuryl methacrylate, tridecyl acrylate, or tridecyl methacrylate.

Useful UV sensitizers or photosensitizers include halogenated polynuclear ketones such as disclosed in U.S. Pat. No. 3,827,957; and organic carbonyl compounds selected from alkyl phenones, benzophenones, and tricyclic fused ring compounds as disclosed in U.S. Pat. No. 3,759,807. Further useful UV sensitizers include carbonylated phenol nuclear sulfonyl chlorides, such as set forth in U.S. Pat. No. 3,927,959. Additional useful photosensitizer combinations particularly suited for pigmented formulations are a combination of sensitizers comprising aromatic carbonyl compounds, aromatic aldehydes or aromatic ketones, and a synergistic sensitizer of about 0.05% to about 3% of 2,2'-dithiobis(benzothiazole), as set forth in U.S. Pat. No. 3,847,771. Typically, at least about 0.5% by weight of the UV sensitizer, and preferably about 1%–5% sensitizer, is added to the ingredients and thoroughly mixed or otherwise dispersed in the liquid carrier ingredients.

Additional conventional additives may be incorporated into the adhesive composition, including, for example, wetting agents, pigments, antioxidants, ultraviolet absorbers, antistatic agents, lubricants, fillers, opacifying agents, antifoam agents, rheology agents, and the like and mixtures thereof. The adhesives may be in a conventional manner, for example, by spraying, knife coating, roller coating, casting, drum coating, dipping, and the like. Indirect application using a transfer process with silicon release paper also can be used. After the adhesive has been applied, the coated stock is dried conventionally.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

In the Examples

The following test procedures and reagents were used in the Examples:
1. 180° Peel Test: PSTC-1 (November 1975), Pressure Sensitive Tape Council, Glenview, Ill. Results of this test are reported in pounds/inch for a 1 in strip (pli).
2. 178° Shear Test: PSTC-7 (November 1975), Pressure Sensitive Tape Council, Glenview, Ill. Results of this test are reported in hours/500 gm/0.25 in$^2$ at 22° C.
3. Loop Tack Test: ASTM D6195-03, ASTM International, 100 Barr Harbor Drive, West Conshohocken, Pa. 19428-2959 USA. Results are reported in pounds/inch for a 1 in strip (pli).
4. Shear Adhesion Test: ASTM WK211, ASTM International, 100 Barr Harbor Drive, West Conshohocken, Pa. 19428-2959 USA. Results are reported in hours (hrs) for a sample of 1"×1"×4 lbs (no dwell).
5. Thumb Appeal: A subjective test using the thumb or forefinger, a qualitative description of how "sticky" the adhesive feels to the touch.
6. Photoinitiators:
   (a) 2,2-dimethoxy-2-phenyl acetophenone (BDK)
   (b) 2-hydroxy-2-methyl-1-phenylpropan-1-one (HMPP)
   (c) bis(2,4,6-trimethyl benzoyl)phenyl phosphineoxide benzophenone 2,2-dimethoxy-2-phenyl acetophenone (BDK)
   (d) 2-hydroxy-2-methyl-1-phenylpropan-1-one (HMPP)
   (e) bis(2,4,6-trimethyl benzoyl)phenyl phosphineoxide benzophenone
7. Reagents:
   (a) Acclaim 3205: poly(oxyalkylene)polymer(polyethylene-polypropylene glycol), hydroxyl value 35, average molecular weight ($M_n$) 3,000, average functionality 2, viscosity 637 mPas @25° C. Bayer
   (b) Acclaim 6320N poly(oxyalkylene)polymer(polyethylene-polypropylene glycol), hydroxyl value 28, average molecular weight ($M_n$) 6,000, average functionality 3, viscosity 1,725 mPas @25° C. Bayer.
   (c) Lexorez 1640-35: polyester polyol of adipic acid, 1,4-butanediol and neopentyl glycol; hydroxyl value 35, average molecular weight ($M_n$) 3200, average functionality 2.0, melting range 20–30° C., viscosity 3100 cps at 60° C. Inolex Chemical.
   (d) Mondur ML: diphenyl methane diisocyanate, mixture of 4,4' (≦60%) and 2,4' and 2,2' isomers (≦50%) isomers. Bayer.
   (e) DC-11: silicone flow agent, Dow Corning.
8. UV Curing Source: 600 W/in "H" bulb, Fusion UV Systems.

Summary of Examples

In Examples 1 and 2 representing 100% polyether based UV curing adhesive systems, acrylate terminated urethane oligomers were synthesized from either a linear polyether or linear and branched polyether polyols whereby the linear polyether polyol is in the 3200 MW range and the branched polyether polyol is in the 6000 MW range and a diisocyanate comprised of Mondur ML aromatic diisocyanate and an acrylic monomer or either phenoxyethyl acrylate or isobornyl acrylate at 0–20 weight percent as a reactive diluent. Urethane theorethical <$M_n$>'s were in the range of 8,000–11,000 for the linear polyether based oligomer and 18,000–21,000 for the linear and branched polyether based oligomers.

In Example 3, representing a 100% polyester based UV curing adhesive system, an acrylate terminated urethane oligomer was synthesized from a linear polyester polyol in the 3200 MW range and a diisocyanate comprised of Mondur ML aromatic diisocyanate and an acrylic monomer or either phenoxyethyl acrylate or isobornyl acrylate at 0–20 weight percent as a reactive diluent resulting in a theoretical <$M_n$>'s in the range of 8,000–11,000.

In Examples 4–7, representing hybrid polyester-polyether UV curing adhesive systems, acrylate terminated urethane oligomers were synthesized from either a linear polyether or linear and branched polyether polyols and a linear polyester polyol whereby the linear polyether polyol is in the 3200 MW range, the branched polyether polyol is in the 6000 MW range and the linear polyester polyol is in the 3200 MW range and a diisocyanate comprised of Mondur ML aromatic diisocyanate and an acrylic monomer or either phenoxyethyl acrylate or isobornyl acrylate at 0–20 weight percent as a reactive diluent. The linear polyether polyol or linear and branched polyether were co-reacted with the linear polyester polyol at a 1 to 20 weight percent combination.

In Examples 8 and 9 representing physical mixtures of 100% polyether and 100% polyester based UV curing adhesive systems, identically synthesized acrylate terminated oligomers from example I and III were combined as analogues to examples IV and VI at a comparable ratio to the coreacted versions In Examples 1–9, the acrylate terminated urethane oligomers were blended at 50 weight percent with 3 to 5 acrylic monofunctional monomers (isobornyl, phenoxyethyl, ethoxyethoxy ethyl acrylate, beta-carboxyethyl, tetrahydrofurfuryl acrylate), a silicone containing flowing agent containing toluene at 0.5 to 1.0 pph and a photoinitiator as the "crosslinker" of either 2,2-dimethoxy-2-phenyl acetophenone (BDK) in the range of 4–6 weight percent or 2-hydroxy-2-methyl-1-phenyl-propan-1-one (HMPP) in the range of 2–4 weight percent.

Adhesive compositions were cast on PET film and cured in air using a single 500 mJ/cm$^2$ (40 ft/min) exposure to a 600 W/in Fusion "H" bulb. Reported adhesive properties are for polyester to stainless steel; peel and tack values indicate the pressure-sensitive character of the cured resin compositions, and the good cohesive strengths (300+ hr shears) are indicative of the crosslinked nature of the adhesives.

Example 1

Comparative

100% Linear Polyether-Based Acrylate-Terminated Urethane UV-Curable PSA

A comparative linear polyether-based acrylate-terminated urethane was synthesized in this example, with theoretical number average molecular weight (<$M_n$>)=10,832. Acclaim 3205 diol (571.23 g) and Mondur ML isocyanate (59.25 g) were charged into a reactor vessel fitted with a mixer, $N_2$ purge, air sparge, and thermocouple. Mixing was initiated at 500 rpm. Dibutyl tin dilaurate catalyst (10% solution of Metacure T-12 brand dibutyl tin dilaurate catalyst, Air Products Company, 0.64 g) was charged into the reactor and the temperature rise monitored, while stirring at 500 rpm was continued. After about forty minutes reaction time, 2-hydroxyethyl acrylate (13.52 g) was metered into the reaction vessel over a 5-minute period. Thereafter, the reaction was permitted to proceed over a 5–6 hour time period while monitoring the reaction temperature. Upon completion of the reaction, the resulting linear polyether-based, acrylate-terminated urethane was withdrawn from the reactor. Titration indicated NCO %<0.1%; a mixture of acrylic monomers.

The comparative linear polyether-based acrylate-terminated urethane (46.95 g) was blended 50/50 (wt/wt) with a mixture of monofunctional monomers, isobornyl acrylate, ethoxyethoxy ethylacrylate, tetrahydrofurfuryl acrylate, weight ratio of 4:1:1 (46.94 g), a silicone flow agent (0.47 pph), and BDK photoinitiator (5.63 pph) (1754 cps viscosity @ 25° C. for the formulated mixture), cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 1

| Test | Adhesive Properties |
|---|---|
| 15 min. stainless steel peel | 2.5 pli |
| 24 hour stainless steel peel | 4.0 pli |
| 24 hour HDPE peel | 1.6 pli |
| Loop tack | 3.3 psi |
| Thumb appeal | Good/positive |
| Stainless steel shear (1" × 1" × 2-kg) @ room temperature | 300+ hours |
| Stainless steel shear (1" × 1" × 1-kg) @ 200° F./93° C.) | 120 hours |
| Shear adhesion failure (5° F./min ramp) | 380° F. |

Example 2

Comparative

Linear and Branched Polyether-Based Acrylate-Terminated Urethane UV-Curable PSA

A comparative mixed linear and branched polyether-based acrylate-terminated urethane (theoretical MW of 20,632) was synthesized by the same general reaction procedure set forth in Example 1 from the following ingredients.

TABLE 2

| Ingredient | Amount (g) |
|---|---|
| Acclaim 3205 linear polyol | 396.42 |
| Acclaim 6320N (4:1 mole ratio 3205:6320N) | 189.25 |
| Mondur ML diisocyanate | 46.66 |
| 2-hydroxyethyl acrylate | 7.04 |

The comparative mixed linear and branched polyether-based acrylate-terminated urethane (46.95 g) was blended 50/50 (wt/wt) with a mixture of monofunctional monomers, isobornyl acrylate, ethoxyethoxy ethylacrylate, tetrahydrofurfuryl acrylate, weight ratio of 4:1:1 (46.94 g), a silicone flow agent (0.47 pph), and BDK photoinitiator (5.63 pph) (4837 cps viscosity @ 25° C. for the formulated mixture), cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 3

| Test | Adhesive Properties |
|---|---|
| 15 min. stainless steel peel | 1.7 pli |
| 24 hour stainless steel peel | 3.3 pli |
| 24 hour HDPE peel | 1.4 pli |
| Loop tack | 2.4 psi |
| Thumb appeal | Good/positive |
| Stainless steel shear (1" × 1" × 2-kg) @ room temperature | 300+ hours |
| Stainless steel shear (1" × 1" × 1-kg) @ 200° F./93° C.) | 28 hours |
| Shear adhesion failure (5° F./min ramp) | 355° F. |

Example 3

Comparative

100% Polyester-Based Acrylate-Terminated Urethane UV-Curable PSA

A 100% polyester-based acrylate-terminated urethane (theoretical MW of 10,832) was synthesized by the same general reaction procedure set forth in Example 1 from the following ingredients.

TABLE 4

| Ingredient | Amount (g) |
|---|---|
| Lexorez 1640-35 | 583.2 |
| Mondur ML isocyanate | 60.75 |
| 2-hydroxyethyl acrylate | 14.58 |

The comparative linear polyester-based acrylate-terminated urethane (46.95 g) was blended 50/50 (wt/wt) with a mixture of monofunctional monomers, isobornyl acrylate, ethoxyethoxy ethylacrylate, tetrahydrofurfuryl acrylate, weight ratio of 4:1:1 (46.94 g), a silicone flow agent (0.47 pph), and BDK photoinitiator (5.63 pph) (8990 cps viscosity @ 25° C. for the formulated mixture), cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 5

| Test | Adhesive Properties |
|---|---|
| 15 min. stainless steel peel | 3.4 pli |
| 24 hour stainless steel peel | 5.4 pli |
| 24 hour HDPE peel | 2.0 pli |
| Loop tack | 3.6 psi |
| Thumb appeal | Borderline/positive |
| Stainless steel shear (1" × 1" × 2-kg) @ room temperature | 300+ hours |
| Stainless steel shear (1" × 1" × 1-kg) @ 200° F./93° C.) | 300+ hours |
| Shear adhesion failure (5° F./min ramp) | 407° F. |

Example 4

Hybrid Polyester-Polyether Acrylate-Terminated Urethane UV-Curable PSA

An inventive polyester-polyether acrylate-terminated urethane (theoretical MW of 10,832) was synthesized by the same general reaction procedure set forth in Example 1 from the following ingredients, except that isobornyl acrylate was added as a non-reactive (for the purposes of urethane synthesis) diluent.

TABLE 6

| Ingredient | Amount (g) |
|---|---|
| Lexorez 1640-35 | 451.2 |
| Acclaim 3205 | 79.75 |
| Mondur ML isocyanate | 55.30 |
| 2-hydroxyethyl acrylate | 13.16 |

The inventive polyester-polyether based acrylate-terminated urethane was blended with a mixture of monofunctional monomers (isobornyl acrylate, ethoxyethoxy ethylacrylate, tetrahydrofurfuryl acrylate) such that urethane oligomer and acrylate monomers were present in equal amounts (wt/wt), and the relative weight ratio of isobornyl acrylate, ethoxyethoxy ethylacrylate, tetrahydrofurfuryl acrylate was 4:1:1. The silicone flow agent (0.47 pph) and BDK photoinitiator (5.63 pph) were added (3926 cps viscosity @ 25° C. for the formulated mixture), the mixture was cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 7

| Test | Adhesive Properties |
|---|---|
| 15 min. stainless steel peel | 3.5 pli |
| 24 hour stainless steel peel | 6.4 pli |
| 24 hour HDPE peel | 2.1 pli |
| Loop tack | 3.5 psi |
| Thumb appeal | Good/positive |
| Stainless steel shear (1" × 1" × 2-kg) @ room temperature | 300+ hours |
| Stainless steel shear (1" × 1" × 1-kg) @ 200° F./93° C.) | 300+ hours |
| Shear adhesion failure (5° F./min ramp) | 395° F. |

Example 5

Hybrid Polyester-Polyether Acrylate-Terminated Urethane UV-Curable PSA

An inventive polyester-polyether acrylate-terminated urethane (theoretical MW 12,302) was synthesized by the same general reaction procedure set forth in Example 1 from the following ingredients.

TABLE 8

| Ingredient | Amount (g) |
| --- | --- |
| Lexorez 1640-35 | 451.20 |
| Acclaim 3205 | 55.75 |
| Acclaim 6320N | 26.62 |
| Mondur ML isocyanate | 53.59 |
| 2-hydroxyethyl acrylate | 12.26 |

The inventive polyester-polyether based acrylate-terminated urethane was blended with a mixture of monofunctional monomers (isobornyl acrylate, ethoxyethoxy ethylacrylate, tetrahydrofurfuryl acrylate) such that urethane oligomer and acrylate monomers were present in equal amounts (wt/wt), and the relative weight ratio of isobornyl acrylate, ethoxyethoxy ethylacrylate, tetrahydrofurfuryl acrylate was 4:1:1. The silicone flow agent (0.47 pph) and BDK photoinitiator (5.63 pph) were added (3750 cps viscosity @ 25° C. for the formulated mixture), the mixture was cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 9

| Test | Adhesive Properties |
| --- | --- |
| 15 min. stainless steel peel | 3.8 pli |
| 24 hour stainless steel peel | 6.2 pli |
| 24 hour HDPE peel | 2.5 pli |
| Loop tack | 3.5 psi |
| Thumb appeal | Good/positive |
| Stainless steel shear (1" × 1" × 2-kg) @ room temperature | 300+ hours |
| Stainless steel shear (1" × 1" × 1-kg) @ 200° F./93° C.) | 300+ hours |
| Shear adhesion failure (5° F./min ramp) | 393° F. |

Example 6

Hybrid Polyester-Polyether Acrylate-Terminated Urethane UV-Curable PSA

The inventive polyester-polyether acrylate-terminated urethane from Example 4, 58.82 g (85% urethane/15% isobornyl acrylate) was blended with a mixture of monofunctional monomers, 41.17 g. The monomer mixture included isobornyl acrylate, 2-phenoxyethyl acrylate, beta-CEA, ethoxy ethoxy ethylacrylate and tetrahydrofurfuryl acrylate (weight ratio 15.6:4.7:4.7:1.3:1). The silicone flow agent (0.47 pph) and BDK photoinitiator (5.63 pph) were added (4443 cps viscosity @ 25° C. for the formulated mixture), the mixture was cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 11

| Test | Adhesive Properties |
| --- | --- |
| 15 min. stainless steel peel | 4.0 pli |
| 24 hour stainless steel peel | 5.5 pli |
| 24 hour HDPE peel | 2.8 pli |
| Loop tack | 5.3 psi |
| Thumb appeal | Good/positive |
| Stainless steel shear (1" × 1" × 2-kg) @ room temperature | 300+ hours |
| Stainless steel shear (1" × 1" × 1-kg) @ 200° F./93° C.) | 300+ hours |
| Shear adhesion failure (5° F./min ramp) | 382° F. |

Example 7

Hybrid Polyester-Polyether Acrylate-Terminated Urethane UV-Curable PSA

The inventive polyester-polyether acrylate-terminated urethane from Example 5, 58.82 g (85% urethane/15% isobornyl acrylate) was blended with a mixture of monofunctional monomers, 41.17 g. The monomer mixture included isobornyl acrylate, 2-phenoxyethyl acrylate, beta-CEA, ethoxy ethoxy ethylacrylate and tetrahydrofurfuryl acrylate (weight ratio 15.6:4.7:4.7:1.3:1). The silicone flow agent (0.47 pph) and BDK photoinitiator (5.63 pph) were added (4353 cps viscosity @ 25° C. for the formulated mixture), the mixture was cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 13

| Test | Adhesive Properties |
| --- | --- |
| 15 min. stainless steel peel | 3.9 pli |
| 24 hour stainless steel peel | 6.8 pli |
| 24 hour HDPE peel | 3.2 pli |
| Loop tack | 4.4 psi |
| Thumb appeal | Good/positive |
| Stainless steel shear (1" × 1" × 2-kg) @ room temperature | 275 hours |
| Stainless steel shear (1" × 1" × 1-kg) @ 200° F./93° C.) | 68 hours |
| Shear adhesion failure (5° F./min ramp) | 325° F. |

Example 8

Comparative

Physical Mixture of 100% Polyether and 100% Polyester UV-Curable PSA

A comparative sample was formulated from the acrylate-terminated oligomers of Examples 1 and 3, which were combined as analogues to the co-reacted versions of Examples 4 and 6.

TABLE 10

| Ingredient | Amount (g) |
| --- | --- |
| Lexorez 1640-35-based urethane | 42.5 |
| Acclaim 3205-based urethane | 7.5 |
| Isobornyl acrylate | 33.33 |
| Ethoxyethoxy ethyl acrylate | 8.33 |

The comparative physical mixture of a polyether and a polyester was combined with a silicone flow agent (0.47 pph), and BDK photoinitiator (5.63 pph) (5623 cps viscosity @ 25° C. for the formulated mixture; cloudy within one day), cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 11

| Test | Adhesive Properties |
| --- | --- |
| 15 min. stainless steel peel | 2.5 pli |
| 24 hour stainless steel peel | 4.0 pli |
| 24 hour HDPE peel | 1.6 pli |
| Loop tack | 3.3 psi |
| Thumb appeal | Good/positive |
| Stainless steel shear (1" × 1" × 2-kg) @ room temperature | 300+ hours |
| Stainless steel shear (1" × 1" × 1-kg) @ 200° F./93° C.) | 120+ hours |
| Shear adhesion failure (5° F./min ramp) | 380° F. |

Example 9

Physical Mixture of 100% Polyether and 100% Polyester UV-Curable PSA

A comparative sample was formulated from the acrylate-terminated oligomers of Examples 1 and 3, which were combined as analogues to the co-reacted versions of Examples 4 and 6.

TABLE 14

| Ingredient | Amount (g) |
| --- | --- |
| Lexorez 1640-35-based urethane | 42.5 |
| Acclaim 3205-based urethane | 7.5 |
| Isobornyl acrylate | 32.33 |
| Ethoxyethoxy ethyl acrylate | 7.08 |

The comparative physical mixture of a polyether and a polyester was combined with a silicone flow agent (0.47 pph), and BDK photoinitiator (5.63 pph) (6365 cps viscosity @ 25° C. for the formulated mixture; cloudy within one day), cast onto a polyethylene terephthalate (PET) film at a 2 mil film thickness, and air cured by exposure to UV-A (750 mJ/cm$^2$) to produce a PSA.

The PSA, then, was tested on stainless steel and high density polyethylene (HDPE) with the following test results being reported.

TABLE 15

| Test | Adhesive Properties |
| --- | --- |
| 15 min. stainless steel peel | 5.1 pli |
| 24 hour stainless steel peel | 6.8 pli |
| 24 hour HDPE peel | 3.1 pli |
| Loop tack | 6.2 psi |
| Thumb appeal | Good/positive |
| Stainless steel shear (1" × 1" × 2-kg) @ room temperature | 129 hours |
| Stainless steel shear (1" × 1" × 1-kg) @ 200° F./93° C.) | 0.4 hours |
| Shear adhesion failure (5° F./min ramp) | 257° F. |

We claim:

1. A pressure sensitive adhesive (PSA) composition, which comprises the ultraviolet radiation (UV) cured reaction product of:
   (a) an acrylate end capped polyester-polyether-based urethane acrylate being reaction product of:
      (i) between about 50 and 90 wt-% of a polyester diol having a molecular weight ranging from about 500 to about 3200;
      (ii) between about 10 and 50 wt-% of a polyether polyol having a molecular weight ranging from about 1000 to about 6000;
      (iii) between about 1 and about 5 wt-% of a hydroxy-functional acrylate; and
      (iv) a polyisocyanate,
      wherein the reaction product contains no residual isocyanate groups;
   (b) one or more acrylate monomers; and
   (c) a UV photosensitizer.

2. The PSA of claim 1, wherein said polyester diol is synthesized by the condensation reaction of one or more of a $C_1$–$C_{12}$ diacid or a $C_1$–$C_{12}$ anhydride with a mixture of diols, wherein said polyester diol has a glass transition temperature, $T_g$, of less than about 25° C.

3. The PSA of claim 2, wherein said $T_g$ is less than about 0° C.

4. The PSA of claim 1, wherein said polyether polyol is synthesized from the reaction of one or more of ethylene oxide or propylene oxide with one or more of a diol, a triol, a dithiol, a diacid, or a diamine.

5. The PSA of claim 4, wherein said polyether polyol is synthesized from the reaction of one or more of ethylene oxide or propylene oxide with a $C_2$ to $C_8$ alkylene glycol.

6. The PSA of claim 5, wherein said alkylene glycol is one or more of ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methyl pentane, 1,5-diol, 1,4-cyclohexanedimethanol, diethylene glycol, or dipropylene glycol.

7. The PSA of claim 2, wherein said polyether polyol is synthesized from the reaction of one or more of ethylene oxide or propylene oxide with a $C_2$ to $C_8$ alkylene glycol.

8. The PSA of claim 1, wherein said hydroxy-functional acrylate is one or more of hydroxyethyl (meth)acrylate, hydroxypropyl (meth)acrylate, hydroxybutyl (meth)acrylate, caprolactone acrylate, hydroxybutyl vinyl ether, or allyl alcohol.

9. The PSA of claim 2, wherein said hydroxy-functional acrylate is one or more of hydroxyethyl (meth)acrylate, hydroxypropyl (meth)acrylate, hydroxybutyl (meth)acrylate, caprolactone acrylate, hydroxybutyl vinyl ether, or allyl alcohol.

10. The PSA of claim 5, wherein said hydroxy-functional acrylate is one or more of hydroxyethyl (meth)acrylate, hydroxypropyl (meth)acrylate, hydroxybutyl (meth)acrylate, caprolactone acrylate, hydroxybutyl vinyl ether, or allyl alcohol.

11. The PSA of claim 1, wherein said polyisocyanate is one or more of hexamethylene diisocyanate, toluene diisocyanate (TDI), diphenylmethane diisocyanate (MDI), m-phenylene diisocyanate, p-phenylene diisocyanate, bitolylene diisocyanate, cyclohexane diisocyanate (CHDI), bis-(isocyanatomethyl) cyclohexane ($H_6XDI$), dicyclohexylmethane diisocyanate ($H_{12}MDI$), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, a polyphenylene diisocyanate, isophorone diisocyanate (IPDI), hydrogenated methylene diphenyl isocyanate (HMDI), tetramethyl xylene diisocyanate (TMXDI), hexamethylene diisocyanate (HDI), or oligomer derivatives thereof.

12. The PSA of claim 1, which additionally comprises one or more of a wetting agent, a pigment, antioxidant, a ultraviolet absorber, an antistatic agent, a lubricant, a filler, an opacifying agent, an anti-foam agent, a rheology agent.

13. A method for formulating an ultraviolet radiation (UV) curable pressure sensitive adhesive (PSA), which comprises the steps of:
    (a) forming an acrylate end capped polyester-polyether-based urethane acrylate by reacting the following ingredients:
        (i) between about 50 and 90 wt-% of a polyester diol having a molecular weight ranging from about 500 to about 3200;
        (ii) between about 10 and 50 wt-% of a polyether polyol having a molecular weight ranging from about 1000 to about 6000;
        (iii) between about 1 and about 5 wt-% of a hydroxy-functional acrylate; and
        (iv) a polyisocyanate,
        wherein the reaction product contains no residual isocyanate groups;
    (b) forming a reaction mixture comprising said polyester-polyether-based urethane acrylate, one or more acrylate monomers, and a UV photosensitizer; and
    (c) subjecting said reaction mixture to the influence of ultraviolet radiation to form said PSA.

14. The method of claim 13, wherein said polyester diol is synthesized by the condensation reaction of one or more of a $C_1$–$C_{12}$ diacid or a $C_1$–$C_{12}$ anhydride with a mixture of diols, wherein said polyester diol has a glass transition temperature, $T_g$, of less than about 25° C.

15. The method of claim 14, wherein said polyester diol is synthesized to have a $T_g$ of less than about 0° C.

16. The method of claim 13, wherein said polyether polyol is synthesized from the reaction of one or more of ethylene oxide or propylene oxide with one or more of a diol, a triol, a dithiol, a diacid, or a diamine.

17. The method of claim 16, wherein said polyether polyol is synthesized from the reaction of one or more of ethylene oxide or propylene oxide with a $C_2$ to $C_8$ alkylene glycol.

18. The method of claim 17, wherein said alkylene glycol is one or more of ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methyl pentane, 1,5-diol, 1,4-cyclohexanedimethanol, diethylene glycol, or dipropylene glycol.

19. The method of claim 14, wherein said polyether diol is synthesized from the reaction of one or more of ethylene oxide or propylene oxide with a $C_2$ to $C_8$ alkylene glycol.

20. The method of claim 1, wherein said hydroxy-functional acrylate is one or more of hydroxyethyl (meth)acrylate, hydroxypropyl (meth)acrylate, hydroxybutyl (meth)acrylate, caprolactone acrylate, hydroxybutyl vinyl ether, or allyl alcohol.

21. The method of claim 14, wherein said hydroxy-functional acrylate is one or more of hydroxyethyl (meth)acrylate, hydroxypropyl (meth)acrylate, hydroxybutyl (meth)acrylate, caprolactone acrylate, hydroxybutyl vinyl ether, or allyl alcohol.

22. The method of claim 17, wherein said hydroxy-functional acrylate is one or more of hydroxyethyl (meth)acrylate, hydroxypropyl (meth)acrylate, hydroxybutyl (meth)acrylate, caprolactone acrylate, hydroxybutyl vinyl ether, or allyl alcohol.

23. The method of claim 13, wherein said polyisocyanate is one or more of hexamethylene diisocyanate, toluene diisocyanate (TDI), diphenylmethane diisocyanate (MDI), m-phenylene diisocyanate, p-phenylene diisocyanate, bitolylene diisocyanate, cyclohexane diisocyanate (CHDI), bis-(isocyanatomethyl) cyclohexane ($H_6XDI$), dicyclohexylmethane diisocyanate ($H_{12}MDI$), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, a polyphenylene diisocyanate, isophorone diisocyanate (IPDI), hydrogenated methylene diphenyl isocyanate (HMDI), tetramethyl xylene diisocyanate (TMXDI), hexamethylene diisocyanate (HDI), or oligomer derivatives thereof.

24. The method of claim 13, which additionally comprises one or more of a wetting agent, a pigment, antioxidant, a ultraviolet absorber, an antistatic agent, a lubricant, a filler, an opacifying agent, an anti-foam agent, a rheology agent.

25. The cured reside of the PSA of claim 1.
26. The cured reside of the PSA of claim 3.
27. The cured reside of the PSA of claim 8.
28. The cured reside of the PSA of claim 11.

* * * * *